United States Patent
Nishikata et al.

(10) Patent No.: US 7,638,912 B2
(45) Date of Patent: Dec. 29, 2009

(54) BRUSHLESS MOTOR WITH BEARING AND BEARING HOUSING

(75) Inventors: Toshiyuki Nishikata, Yonago (JP); Koji Kuyama, Yonago (JP); Kinjiro Okinaga, Yonago (JP); Kumio Masuda, Yonago (JP); Hiroshi Ikeno, Yonago (JP); Tsuyoshi Kanou, Yasugi (JP)

(73) Assignee: Panasonic Corporation, Osaka (JP)

( * ) Notice: Subject to any disclaimer, the term of this patent is extended or adjusted under 35 U.S.C. 154(b) by 304 days.

(21) Appl. No.: 11/174,564

(22) Filed: Jul. 6, 2005

(65) Prior Publication Data

US 2006/0006746 A1    Jan. 12, 2006

(30) Foreign Application Priority Data

Jul. 8, 2004 (JP) .............................. 2004-201520
May 16, 2005 (JP) .............................. 2005-142005

(51) Int. Cl.
    *H02K 7/08* (2006.01)
(52) U.S. Cl. ...................................... 310/90; 310/67 R
(58) Field of Classification Search ............... 310/67 R, 310/90, 89, 91
    See application file for complete search history.

(56) References Cited

U.S. PATENT DOCUMENTS

| | | | | |
|---|---|---|---|---|
| 5,610,462 A | * | 3/1997 | Takahashi | 310/90 |
| 5,654,597 A | * | 8/1997 | Sakashita et al. | 310/51 |
| 5,969,448 A | * | 10/1999 | Liu et al. | 310/90 |
| 6,023,114 A | * | 2/2000 | Mori et al. | 310/90 |
| 6,072,660 A | * | 6/2000 | Teshima | 360/99.08 |
| 6,384,495 B1 | * | 5/2002 | Suzuki et al. | 310/67 R |
| 6,567,268 B1 | * | 5/2003 | Hsieh | 361/695 |
| 6,661,131 B2 | * | 12/2003 | Fukutani | 310/51 |
| 6,882,074 B2 | * | 4/2005 | Horng et al. | 310/90 |
| 2002/0074879 A1 | * | 6/2002 | Jun | 310/90 |

FOREIGN PATENT DOCUMENTS

| | | |
|---|---|---|
| CN | 1120258 A | 4/1996 |
| CN | 1510821 A | 7/2004 |
| JP | 08289523 | 11/1996 |
| JP | 11-243657 | 9/1999 |
| JP | 2000-023412 | 1/2000 |
| JP | 2000125505 | 4/2000 |
| JP | 2002-176742 | 6/2002 |
| JP | 2004-40886 | 2/2004 |

* cited by examiner

*Primary Examiner*—Dang D Le
(74) *Attorney, Agent, or Firm*—Steptoe & Johnson LLP

(57) ABSTRACT

In a separation preventing mechanism used in a brushless motor, an insertion section is formed into a separation preventing member (5) using resin, which has a form difficult to shape with a metal pressed part, and to which a latching member (4) can be inserted by combining rotation and shaft-direction insertion, making it easy to disassemble it after assembly and size adjustment.

3 Claims, 8 Drawing Sheets

FIG. 5a
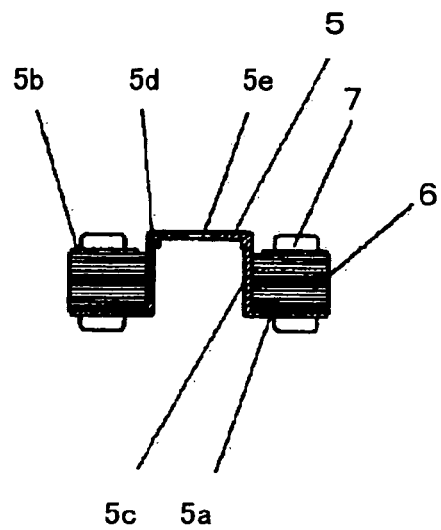
FIG. 5b
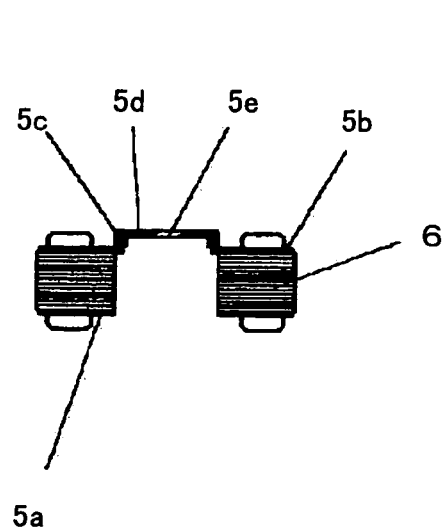
FIG. 6a
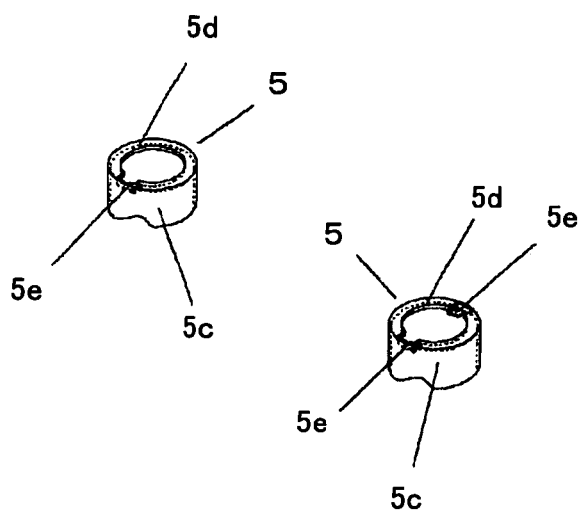
FIG. 6c
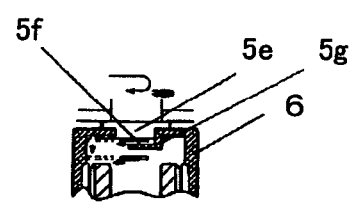
FIG. 6b

BRUSHLESS MOTOR WITH BEARING AND BEARING HOUSING

BACKGROUND OF THE INVENTION

1. Field of the Invention

The present invention relates to a brushless motor which rotates disks such as CD (Compact Disk), DVD (Digital Versatile Disc), and MD (Mini Disk).

2. Background of the Related Art

Conventionally, added to a brushless motor is a separation preventing structure to prevent separation of a rotor from a motor in case a force overtaking the magnetic attractive force between the rotor magnet and a stator core is applied to the motor due to shock, etc. Adopted in general as the separation preventing structure is a structure wherein an engaging section is installed on a bearing housing, a separation preventing member is installed on a rotor unit opposing the bearing housing, and the two are engaged (see JP H10-23702 for example).

Also, adopted is a structure such as that in which a groove is formed on a part of a shaft to allow a separation preventing member to be engaged to the groove.

Shown in FIG. 8 is the structure of the conventional brushless motor. In FIG. 8, reference character 21 is a rotor, 22 is a shaft, 25 is a separation preventing member, 23 is a bearing, 24 is a bearing housing, 26 is a connection section, and 27 is a stator core. The bearing housing 24 is made by the metal cutting and shaving process, and an engaging section 26 is installed on the end section. The separation preventing member 25 has elasticity. In assembling the brushless motor, as the shaft 22 is inserted into the bearing 23, the tip of the separation preventing member 25 makes contact with the engaging section 26, and as the shaft 22 is further inserted, it expands in the outer diameter direction of the engaging section 26 by the elasticity of the separation preventing member 25. As the shaft 22 is further inserted, at the point when the tip of the separation preventing member 25 has passed the outer diameter of the engaging section 26, it becomes smaller than the outer diameter of the engaging section 26 due to its elasticity. As a result, it returns to its original shape, and thus the tip of the separation preventing member 25 enters the engaging section 26 to function as a separation preventer.

With current disk drives, thickness reduction and miniaturization are demanded, and as the often used bearing retaining structure for a brushless motor, other than those using a metal cut/shaved member such as brass as a bearing housing which is a bearing retaining member as in the conventional brushless motor, various kinds are proposed, such as those using a sintered member of the same material as the bearing. In order to deal with the rapid cost reduction of recent years, it has become necessary to construct the bearing retaining structure with a combination of low-cost members.

Most representative is a structure in which the bearing retaining mechanism contains is only pressed metal items. As such structure several have been proposed.

In the case of the brushless motor shown in FIG. 13, the motor is constructed of a rotor unit 101 and a stator unit 102, a motor mounting plate 103 of the stator unit 102 has a burring section 104 formed around its central section by the burring process, which functions as a bearing housing by press fitting a bearing 106 which supports a shaft 105 in a freely rotatable manner within the burring section 104. At the entrance of the burring section 104, fixed by press fitting is a thrust cap 107 which supports the weight of the rotor unit 101 in the thrust direction. Indicated as 108 is an abrasion resistant thrust plate 108 (see JP H08-289523 for example).

In the case of a brushless motor shown in FIG. 14, the motor consists of a rotor unit 109 and a stator unit 110, a motor mounting plate 111 of the stator unit 110 has a burring section 112 formed around its central section by the burring process, and press fitted and fixed in the burring section is a cup-shape bearing housing 113 which has its bottom integrated with one end of the tube section. Fit inside the bearing housing 113 is a bearing 115 which supports a shaft 114 in a freely rotatable manner. Installed on the bottom section of the bearing housing 113 is an abrasion resistant thrust plate 116, by which the weight of the rotor 109 in the thrust direction is freely supported by this thrust plate 116 (see JP2000-125505 for example).

However, with the conventional construction shown in FIG. 8, there is the problem that, because the separation preventing member is difficult to operate from outside of the brushless motor, disassembly and repair after assembling are difficult. Also because the separation preventing member is installed in a very narrow space between the rotor and stator core, it is difficult to appropriately set the elasticity of the separation preventing member. Furthermore, since the separation preventing member is formed by press-processing a metallic plate, because it contains a bending process, it is difficult to maintain the bending angle with high accuracy.

The present invention solves such conventional problems, and has the objective of providing a brushless motor in which disassembly is easy, even after assembling, and adjusting the dimensions and setting the elasticity of the separation preventing member is also easy.

Also, in recent years, further miniaturization and thickness reduction are demanded to brushless motors used in disk drives.

However, in the conventional construction shown in FIG. 8, with the bearing retaining mechanism shown in FIG. 13, as the motor is made more compact and thinner, the length of the part where the bearing housing 24 is fixed to the motor mounting base becomes shorter in the press fit direction of the thrust cap 107 shown in FIG. 13, the joint strength decreases, and the retaining strength becomes short relative to the support of the weights of the rotor units 21 and 101 in the thrust direction. Even if an adhesive is used when fixing, the adhesive flows out to the parts of the bearings 21 and 106, negatively affecting reliability. Also, fixing by welding is difficult to implement due to its construction.

Also, in the bearing retaining mechanism shown in FIG. 14, as the motor is made more compact and thinner, the length of the bearing housing 113 and the motor mounting plate 111 in the press fit direction decreases, and the joint strength becomes short. With this construction, in order to take measures to support the weight of the rotor unit in the thrust direction as in the bearing retaining mechanism shown in FIG. 13, the outer diameter step section 117 of the bearing housing 113 must be supported by the end face of the burring section 118 of the motor mounting plate 111. If the motor is forcibly made compact and thinner, it becomes difficult to simultaneously securing both joint strength of the bearing housing 113 with the bearing 115 fit inside its inner diameter and joint strength with the motor mounting plate 111.

In the bearing retaining mechanism shown in FIG. 14 also, fixing is difficult to accomplish by welding due to its construction, similar to the case of FIG. 13, and fixing with an adhesive is not useful because there is concern that such adhesive might flow to the lower face of the motor mounting plate.

As the motor becomes more compact and thinner, it is obvious that securing the joint strength is accomplished only by press fit fixing, and the present invention has an objective of providing a brushless motor in which high supporting rigidity in the thrust direction weight of the rotor unit is secured, and in which the bearing housing can also have a highly-reliable tight connection other than by press fit fixing.

SUMMARY OF THE INVENTION

In order to overcome these problems, the present invention prevents the rotor from falling off and removes it as needed by the resin formation of the insertion section into a separation preventing member, difficult to form with a metal pressed part, and to which a latching member can be inserted by combining rotation and insertion in the shaft-direction.

The brushless motor according to the first aspect of the present invention is characterized by the fact that has a rotor assembly equipped with a shaft, a rotor frame having a tight-connecting section formed in its center to fix the shaft, a rotor magnet fixed to the rotor frame, and a latching member which is fixed to the outer circumference of the tight-connecting section, and has a latching protrusion, and a stator assembly equipped with a bearing which supports the shaft, a bearing housing which retains the bearing, a motor mounting plate which retains the bearing housing, and a stator core which is placed opposing the rotor magnet and covered with a coil via an insulation member. Additionally attached to the stator assembly from above the bearing housing is a separation preventing member which combines with the latching member protrusion and prevents the rotor assembly from separating from the stator assembly, and formed on the separation preventing member is a penetrating section formed so that the latching protrusion can penetrate by combining rotation and insertion in the shaft direction, and in which disassembly is easy, even after assembling. Adjusting the dimensions and setting the elasticity of the separation preventing member are also easy with this construction.

The brushless motor according to the second aspect of the present invention is characterized by the fact that in the first aspect, the separation preventing member is formed as a single unit with the insulation member using resin.

The brushless motor according to the third aspect of the present invention is characterized by the fact that in the second aspect, the separation preventing member is provided between the stator core and the bearing housing.

The brushless motor according to the fourth aspect of the present invention is characterized by comprising a disk drive in which the shaft of the rotor unit is supported so as to be rotatably attached to the motor mounting plate of the stator unit via the bearing and the bearing housing, in which the bearing set in the inner circumference is formed in a tube shape, with its base end supported by the motor mounting plate, in which the shaft end face supported to be freely rotatable by the bearing is supported in the thrust direction by bringing it into contact with the motor mounting plate directly or via the thrust plate.

The brushless motor according to the fifth aspect of the present invention is characterized by the fact that in the fourth aspect, a concave section in which the outer circumference of the base end of the bearing housing fits is formed on the motor mounting plate so that the shaft end face is supported by the bottom of the concave section.

The brushless motor according to the sixth aspect of the present invention is characterized by the fact that in the fifth aspect, a groove with which the base end of the bearing housing connects is formed on the bottom of the concave section formed on the motor mounting plate.

The brushless motor according to the seventh aspect of the present invention is characterized by the fact that in the fifth or sixth aspect, a concave section for containing the thrust plate is formed on the bottom of the concave section formed on the motor mounting plate.

The brushless motor according to the eighth aspect of the present invention is characterized by the fact that it has the built-in brushless motor according to one of the fourth to seventh aspects.

According to the construction of the first aspect of the present invention, disassembly of the motor is easy.

According to the construction of the second aspect of the present invention, because the number of parts can be reduced by uniting with the insulating body of the stator core, the number of manufacturing processes and related cost can be reduced.

According to the construction of the third aspect of the present invention, because the stator core and the bearing are not directly fixed with a metallic part, the influence on the bearing from vibration generated by switching of driving current supplied to a coil wound around the stator core when the brushless motor is operated can be reduced.

Also, according to the construction of the fourth or fifth aspect of the present invention, by forming the bearing housing in a tubular shape and having its base end supported by the motor mounting plate, the motor mounting plate can function as the thrust direction support of the shaft, and supporting rigidity for the thrust direction weight of the rotor unit can be secured. Also, because the motor mounting plate of such a shape can be formed as a single unit by press processing, in addition to the fact that the elements are relatively inexpensive, the number of parts can be reduced, with improved ease of assembly.

Also, according to the construction of the sixth aspect of the present invention, by forming a groove in which the base end of the bearing housing connects to the bottom of a concave section formed on the motor mounting plate, the intrusion of sputter into the bearing unit occurring during fixing by welding or the intrusion of an adhesive flowing out during fixing with an adhesive can be prevented, and tightly connecting the bearing housing and the motor mounting plate is possible with high reliability.

Also, according to the construction of the seventh aspect of the present invention, fixing the bearing housing and the motor mounting plate can be tightened with high reliability using a method other than press fitting, enabling easy construction even in a motor requiring miniaturization and reduction of thickness.

BRIEF DESCRIPTION OF THE DRAWINGS

FIGS. 5a and 5b are a cross-sectional view of a stator core unit and a cross-sectional view of another stator core unit of the same embodiment;

FIGS. 6a, 6b, and 6c are an oblique view of another separation preventer, an oblique view of another separation preventer, and a cross-sectional view of a main section of another separation preventer of the same embodiment;

DEATILED DECRPTION OF THE PREFERRED EMBODIMENTS

Embodiments of the rotor separation preventing structure of the brushless motor of the present invention are explained hereafter, with reference to FIG. 1 to FIG. 7.

Embodiment 1

Figure 1:
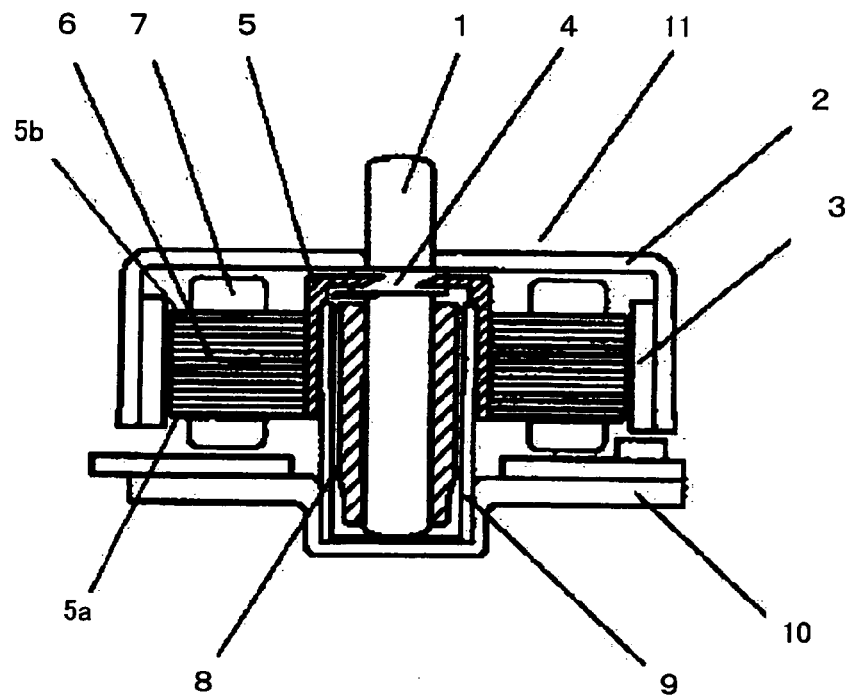
FIG. 1 is a cross-sectional view showing a brushless motor of (Embodiment 1) of the present invention.

FIG. 1 is a brushless motor 11 constructed of a rotor assembly comprising a rotor frame 2 with a shaft fixed in its center, a rotor magnet 3 attached to the inner circumference side of the rotor frame 2, and a latching member 4 attached to the fixed section of the shaft 1 on the top surface of the rotor frame 2, and a stator assembly comprising of a bearing 8 which supports the shaft 1 to be freely rotatable, a tube-shape bearing housing 9 which retains the bearing 8 on its inner circumference side, a motor mounting plate 10 which retains fixed the bearing housing 9 by press fitting, etc., a stator core 6 which is attached to the outer circumference side of the bearing housing 9, a coil 7 wound via insulation members 5a and 5b attached on the surface of this stator core 6, and a separation preventing member 5 which is attached to the stator core 6.

Figure 2:
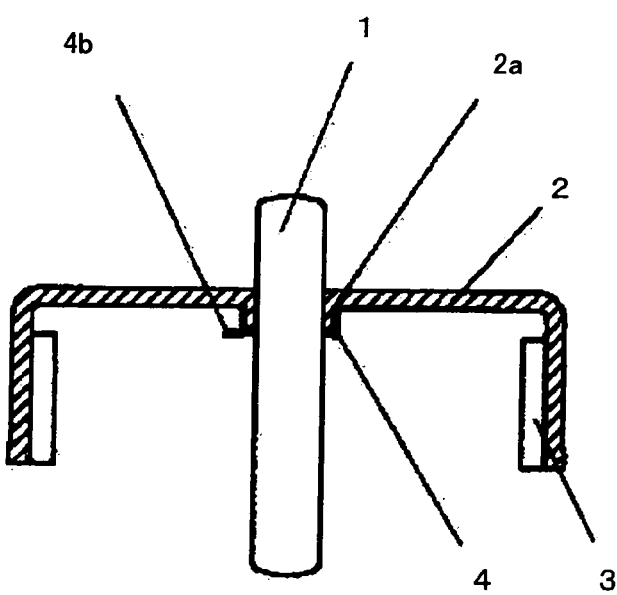
FIG. 2 is a cross-sectional view of a rotor assembly of the same embodiment.
Figure 3A:
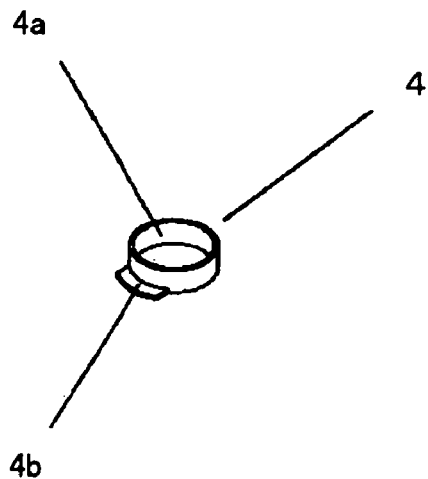
FIGS. 3a and 3b are an oblique view of a latching member and an oblique view of another latching member of the same embodiment.
Figure 3B:
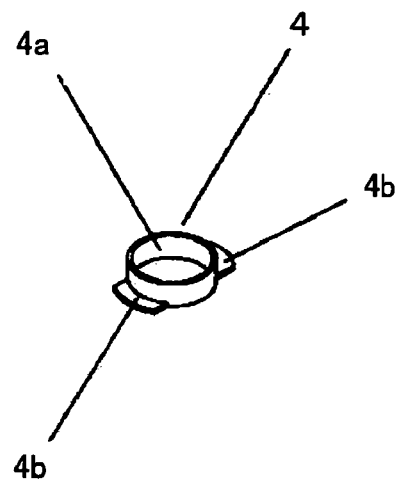
Figure 4A:
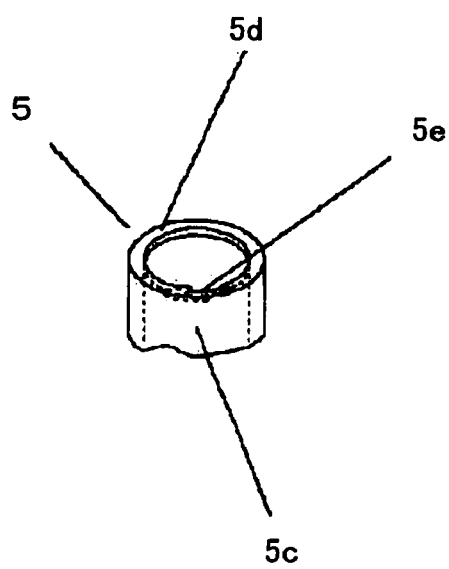
FIGS. 4a and 4b are an oblique view of a separation preventer and an oblique view of another separation preventer of the same embodiment.
Figure 4B:
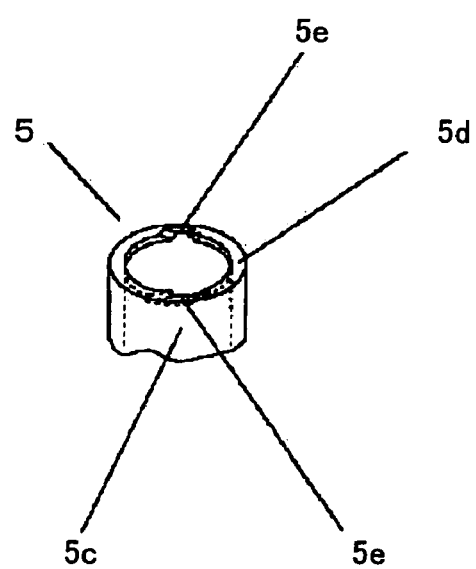
Figure 7:
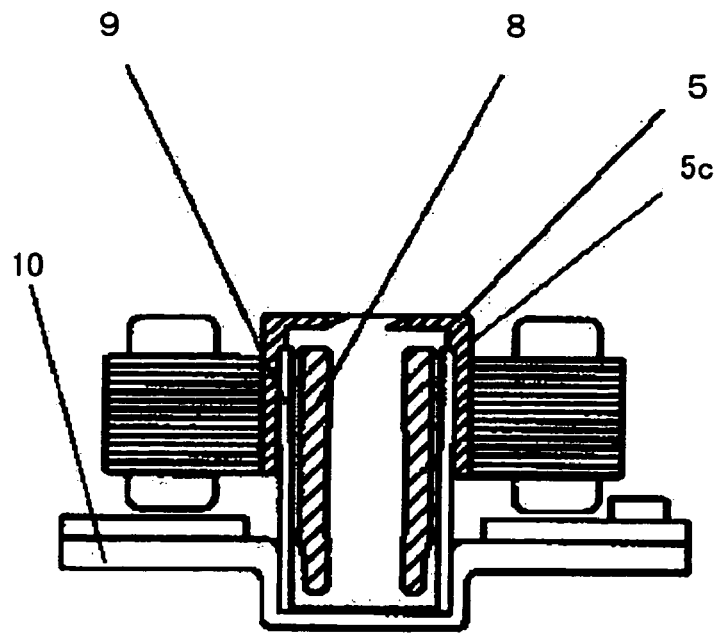
FIG. 7 is an explanatory diagram for assembling a stator unit of the same embodiment.
Figure 8:
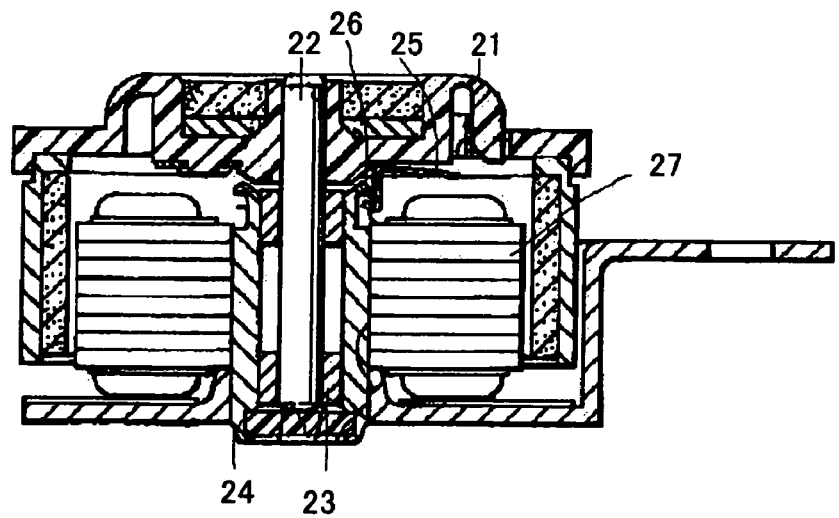
FIG. 8 is a cross-sectional view of a conventional brushless motor.

As shown in FIG. 2, a tube-shape tight-connecting section 2a is formed protruding inwardly in the shaft direction on the center of the top surface of the rotor frame 2, within which the shaft 1 is fixed by press fitting, etc. As shown in FIG. 3a, the latching member 4 comprises a ring unit 4a which can be inserted outside the tight-connecting section 2a of the rotor frame 2 and a latching protrusion 4b installed extending in the radial direction on the outer circumference of the ring unit 4a. As shown in FIG. 3b, a plurality of latching protrusions 4b may be formed in the direction of the circumference. Conversely, as shown in FIG. 4a, the separation preventing member 5 comprises of a tube section 5c and a rim 5d installed extending toward the center from one end, the inner diameter of this rim is formed smaller than the diameter of the outer contact circle of the latching protrusion 4b of the latching member 4, and an insertion section 5e which has a width and shape such that the latching protrusion 4b can penetrate into a part of the rim 5d in the shaft direction as it is inclined and rotated. The insertion section 5e is formed by cutting out the rim 5d in the inclined shape of a male screw. When a plurality of latching protrusions 4b are formed in the circumference direction as shown in FIG. 3b, the same number of insertion sections 5e of the separation preventing member 5 may be formed in positions corresponding to the latching protrusions 4b, as shown in FIG. 4b. In this embodiment, as shown in FIG. 5a the tube section 5c of the separation preventing member 5 is formed to be insertible to the inner hole of the stator core 6, and is also formed as one unit with the separation preventing member 5 and the insulation member 5a attached to the bottom face of the stator core 6 by resin formation. As shown in FIG. 7 the inner circumference side of the tube section 5c of the separation preventing member 5 inserted to the inner hole of the stator core 6 is fixed to the outer circumference side of the bearing housing 9 by press fitting, etc. Also, as shown in FIG. 5b, the separation preventing member 5 may be formed as a single unit with the insulation member 5b attached to the top face of the stator core 6 by resin formation. In this case, because the tube section 5c of the separation preventing member 5 is not inserted to the inner hole of the stator core 6, the stator core 6 may be directly fixed to the outer circumference of the bearing housing 9 with a glue, etc.

Assembly may be done by inclining and rotating the tip of the latching protrusion 4b of the rotor assembly shown in FIG. 2 to permit it to screw in and penetrate the insertion section 5e of the separation preventing member 5 shown in FIG. 5a or FIG. 5b. Also, by screwing back the rotor assembly as though rotating it in reverse, the rotor assembly can be easily removed from the stator assembly.

Furthermore, as shown in FIG. 6a to FIG. 6c, when the cross-sectional shape of the insertion section 5e of the separation preventing member 5 is formed in an L shape instead of a slope, there is no need to incline the latching protrusion 4b of the rotor assembly in the shaft direction when the rotor assembly is assembled into the stator assembly. Instead, as shown in FIG. 6c, it can be inserted straight from the upper face side of the insertion section and inserted to near the bottom section 5f of the L-shape wall surface, the latching protrusion 4b is rotated along the bottom section 5f in the opposite direction from the side wall 5g of the L-shape wall face to the position which does not overlap with the bottom section 5f and further inserted downwards, and it can be allowed to penetrate by rotating it in the opposite direction. Also, by performing an action opposite to the above as though rotating the rotor assembly in reverse, the rotor assembly can be easily removed from the stator assembly.

In the case of this construction, because there is no need to insert the shaft 1 inclined to the bearing 8, there will be no possibility that an excessive force is applied to the bearing 8 to cause damage.

Embodiments concerning the bearing retaining structure and tight connection of the bearing retaining member of the brushless motor of the present invention are explained hereafter, with reference to FIG. 9 to FIG. 12.

Embodiment 2

Figure 9:
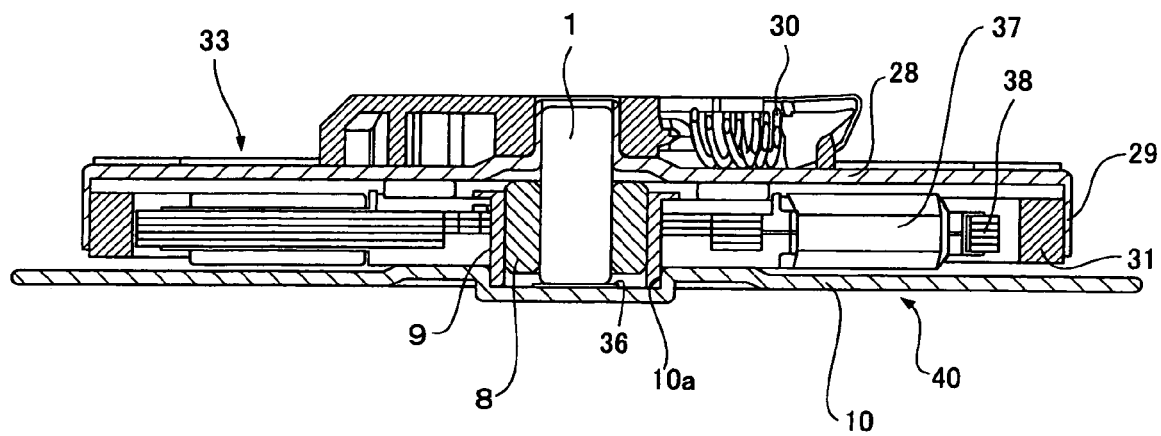
FIG. 9 is a cross-sectional view of a brushless motor of (Embodiment 2) of the present invention.
Figure 10A:
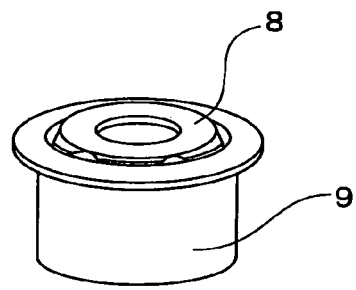
FIGS. 10a and 10b are an oblique view of an assembled state of a bearing housing and a bearing of the brushless motor of the same embodiment, and an oblique view of an assembled state when it is locked to a motor mounting plate.
Figure 10B:
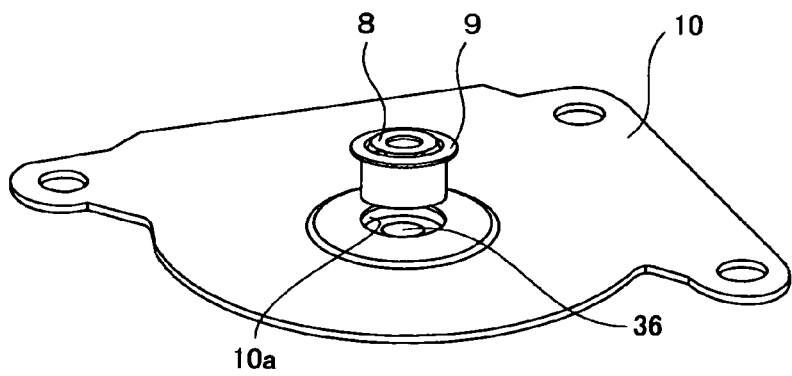

Shown in FIG. 9, FIG. 10a, and FIG. 10b is the brushless motor of (Embodiment 2) of the present invention.

In FIG. 9 the brushless motor is composed of a rotor unit 33 and a stator unit 40.

The rotor unit 33 has a turn table unit 28 which mounts a disk, a rotor frame 29, a disk alignment member 30 which supports the disk together with the turn table unit 28, a rotor magnet 31 attached to the rotor frame 29, and a shaft 1 fixed to the center of the rotor frame 29.

The stator unit 40 has a bearing 8 which supports the shaft 1, a bearing housing 9 which retains the bearing 8, a thrust plate 36 which supports the shaft 1 in the shaft direction, a core 38 which is placed opposing the rotor magnet 31 and to which a coil 37 is wound, and a motor mounting plate 10 which retains the bearing housing 9.

The bearing housing 9 is formed in a single unit in approximately a tubular shape, within which the bearing 8 is fitted. Also, a concave section 10a in which the bearing housing 9 can fit is formed on the motor mounting plate 10 in a single unit by the press processing.

Assembly is done first by fitting the bearing 8 in the bearing housing 9 as in FIG. 10a, and after preparing the accuracy and porosity of the inner diameter of the bearing by rotation sizing etc., fitting the bearing housing 9 in the concave section 10a installed on the motor mounting plate 10 as shown in FIG. 10b. Note that the thrust plate 36 is pre-set on the bottom section of the concave section 10a.

By this means, the end face of the shaft 1 supported by the bearing 8 makes contacts with and is supported in the thrust direction by the concave section 10a formed in a single unit with the motor mounting plate 10 via the thrust plate 36, enabling realization of construction in which the motor mounting plate 10 serves as a support for the thrust direction weight of the rotor unit 33. Because its retaining capability does not receive any influence from a member tight connection, even if miniaturization and thickness reduction of the motor advances, its change does not have any influence, securing enough rigidity for the thrust weight.

Embodiment 3

Figure 11A:
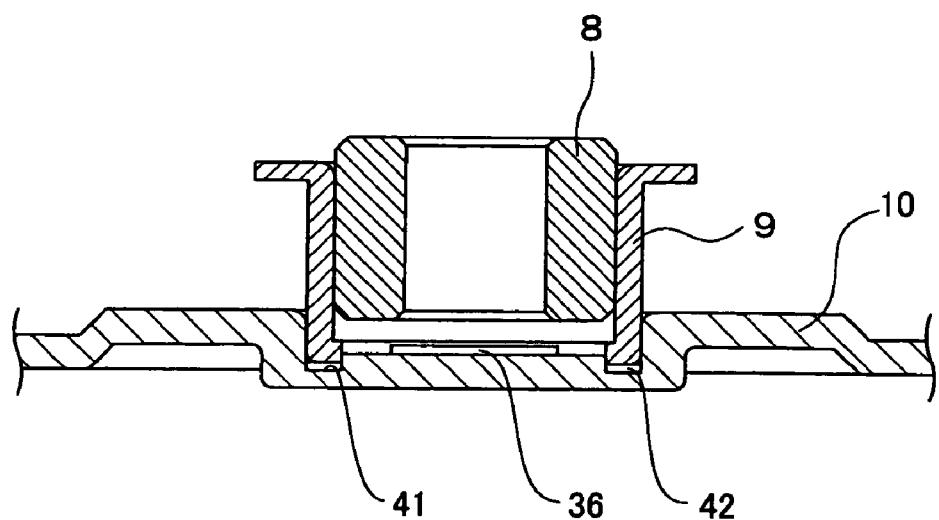
FIGS. 11a and 11b are a cross-sectional view of a main section of a brushless motor of (Embodiment 3) of the present invention and an oblique view of a motor mounting plate.
Figure 11B:
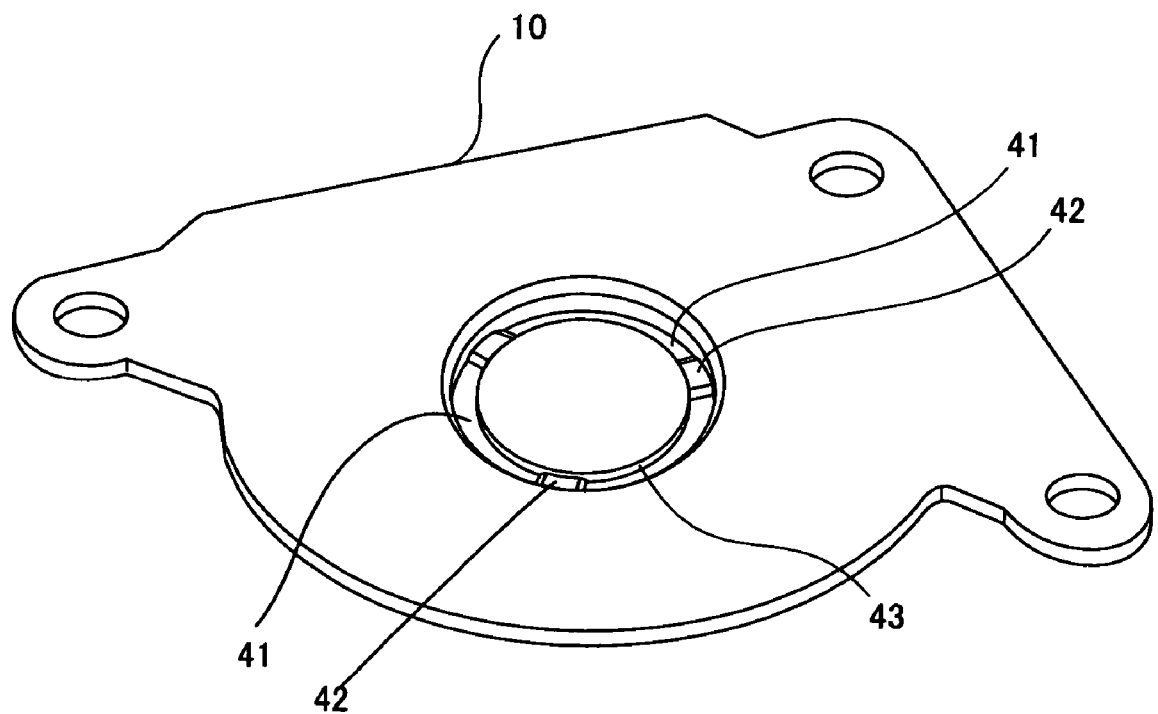

Shown in FIG. 11a and FIG. 11b is (Embodiment 3) of the present invention.

Although in FIG. 9 the bottom section of the concave section 10a of the motor mounting plate 10 is flat and only the outer circumference of the base end of the bearing housing 9 fits in the concave section 10a, this embodiment is different from (Embodiment 2) only in that a groove 41 in which the base end of the bearing 9 fits is formed on the bottom section of the concave section 10a. The other construction of the brushless motor is the same as in FIG. 9.

More specifically, as shown in FIG. 11a, the groove 41 is further installed on the bottom face of the concave section 10a formed on the motor mounting plate 10 as a single unit. The thrust plate 36 is installed on the inner side of the groove 41.

As shown in FIG. 11b, formed at plural locations inside the groove 41 are convex sections 42 set lower than the height of the fitting groove inner diameter side wall 43. This will become a projection when welding the bearing housing 9.

It is widely known that sputtering becomes a problem in forming a tight connection by welding. Sputter reaching a bearing is fatal in a brushless motor. By setting the convex section 42 lower than the height of the fitting groove inner diameter side wall 43 as in the above, the generated sputter cannot exceed the fitting groove inner diameter side wall 43. In other words, sputter does not intrude on the bearing unit, solving the reliability problem, making possible a tight connection by stable welding, with high reliability.

Needless to say, a tight connection with glue becomes possible if the convex section 42 is not formed. In this case, because the fitting groove inner diameter side wall 43 can prevent the glue from flowing to the bearing unit, a tight connection with a glue and high reliability becomes possible.

Embodiment 4

Figure 12A:
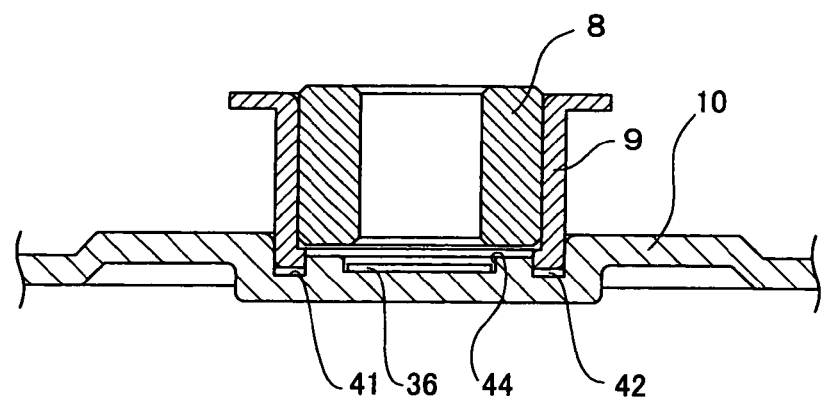
FIGS. 12a and 12b are a cross-sectional view of a main section of a brushless motor of (Embodiment 4) of the present invention and an oblique view of a motor mounting plate.
Figure 12B:
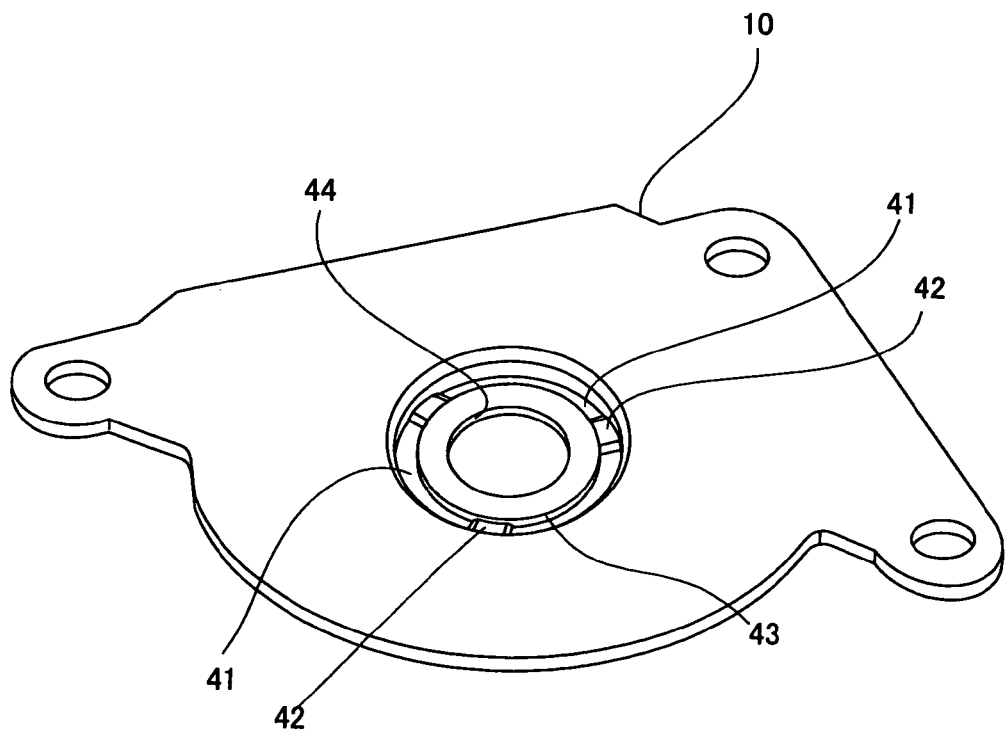
Figure 13:
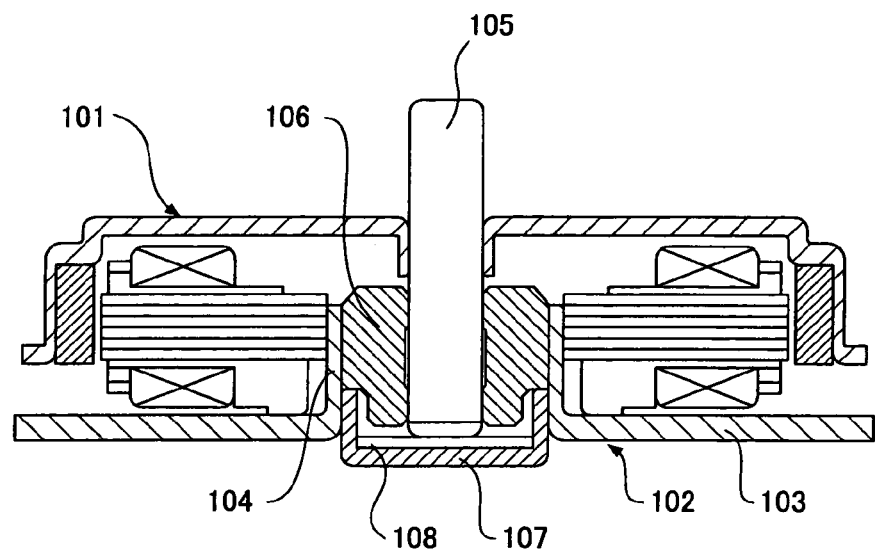
FIG. 13 is a cross-sectional view of a conventional brushless motor.
Figure 14:
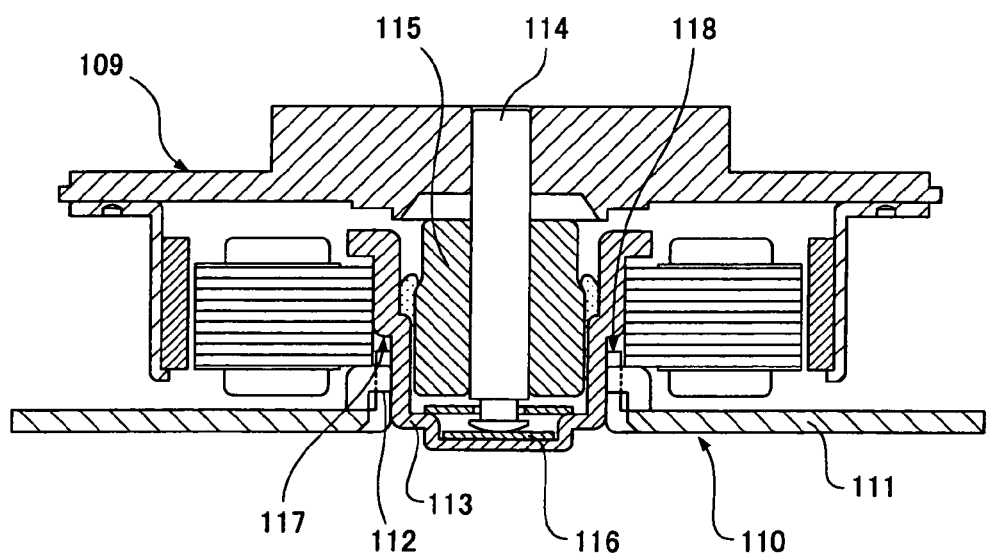
FIG. 14 is a cross-sectional view of another conventional brushless motor.

Shown in FIG. 12a and FIG. 12b is (Embodiment 4) of the present invention.

Although the thrust plate 36 in FIG. 11a was placed on a flat face on the inner side of the groove 41 on the bottom section of the concave section 10a of the motor mounting plate 10, a concave section 44 which contains a thrust plate 36 is formed as a single unit on the inner side of the groove 41 in FIG. 12a and FIG. 12b.

This makes it possible to secure its strength by reducing the plate thickness only for the shaft-direction supporting of the shaft 1 while retaining the plate thickness of the motor mounting plate 10 and securing the length of the bearing 8, making it superior in terms of reliability, extending the lifetime of the motor in a brushless motor of which further miniaturization and thickness reduction are demanded.

Note that the brushless motors of the embodiments can be used in various kinds of disk drives such as disk players and disk recorders to contribute to the thickness reduction of the disk drives.

Also, whereas the thrust plate 36 was placed between the shaft 1 and the motor mounting plate 12 in the embodiments, the thrust plate 36 may be omitted.

The brushless motor of the present invention is useful as a brushless motor for mobile equipment such as spindle motors for optical media such as CD, DVD, and MD of which high reliability is demanded in addition to miniaturization and thickness reduction. Also, the brushless motor having the rotor separation preventing mechanism of the present invention is not limited to this use but can also be applied to information recording/playback devices using other recording media and various kinds of power motors.

What is claimed is:

1. A brushless motor comprising:
    a motor mounting plate comprising a first concave portion and a substantially planar portion, the first concave portion being recessed relative to the planar portion, said first concave portion being an integral part of the motor mounting plate formed by press processing, the motor mounting plate further comprising a first convex portion in a center of the first concave portion, thereby forming a circular groove between an outer circumference of the first convex portion and the inner circumference of the first concave portion;
    a shaft supported by said motor mounting plate, the shaft having an end face contacting the first convex portion of said motor mounting plate either directly or via a thrust plate,
    a tube-shaped bearing housing comprising a base fitted within the groove of the motor mounting plate and supported by said motor mounting plate, such that an outer circumference of the bearing housing fits against an inner circumference of said concave portion, and
    a bearing set in an inner circumference of said bearing housing, for rotatably supporting said shaft,
    wherein at least one second convex portion is located in the groove of the motor mounting plate,
    the at least one second convex portion extending radially across the groove and having a height lower than a height of the outer circumference of the first convex portion.

2. The brushless motor according to claim 1, wherein the first convex portion of the motor mounting plate comprises a second concave section at its center, the second concave section for receiving a thrust plate.

3. A disk drive having a built in brushless motor according to claim 1.

* * * * *